(12) United States Patent
Baessler et al.

(10) Patent No.: US 10,891,591 B2
(45) Date of Patent: Jan. 12, 2021

(54) MAINTAINING A CUSTODIAN DIRECTORY BY ANALYZING DOCUMENTS

(71) Applicant: International Business Machines Corporation, Armonk, NY (US)

(72) Inventors: Michael Baessler, Neckartenzlingen (DE); Jochen Doerre, Boeblingen (DE); Thomas A. P. Hampp-Bahnmueller, Stuttgart (DE); Philipp Hoffmann, Weil im Schonbuch (DE); Juergen Maletz, Wildberg (DE); Daniel Pittner, Steinenbronn (DE); Werner Schollenberger, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 15/955,249

(22) Filed: Apr. 17, 2018

(65) Prior Publication Data

US 2018/0232698 A1    Aug. 16, 2018

Related U.S. Application Data

(63) Continuation of application No. 14/805,631, filed on Jul. 22, 2015, now Pat. No. 10,007,894.

(51) Int. Cl.
*G06F 7/02* (2006.01)
*G06F 16/00* (2019.01)
(Continued)

(52) U.S. Cl.
CPC .......... *G06Q 10/105* (2013.01); *G06F 16/13* (2019.01); *G06F 16/93* (2019.01); *G06F 40/205* (2020.01);
(Continued)

(58) Field of Classification Search
CPC .... G06F 19/322; G06F 17/2705; G06F 16/93; G06F 17/278; G06F 16/13; G06F 16/986;
(Continued)

(56) References Cited

U.S. PATENT DOCUMENTS 7,620,630 B2    11/2009   Lloyd et al.
8,224,924 B2    7/2012    Andersen et al.
(Continued)

OTHER PUBLICATIONS

Unknown, "Conversation threading," Wikipedia,the Free Encyclopedia, printed Apr. 29, 2015, 3 pages http://en.wikipedia.org/wiki/Conversation_threading.
(Continued)

*Primary Examiner* — Bruce M Moser
(74) *Attorney, Agent, or Firm* — Robert J. Shatto

(57) ABSTRACT

A computer processor may extract identity information from a document. The identity information may include at least one custodian identity attribute. After extracting the identity information, the computer processor may determine that the identity information is associated with a specific custodian. The computer processor may then search for the custodian identity attribute in a custodian directory to determine whether the custodian directory contains an entry for the custodian. If the custodian is not in the custodian directory, the computer processor may create a new entry in the custodian directory for the custodian and store the extracted identity information in the new entry.

20 Claims, 6 Drawing Sheets

(51) Int. Cl.
*G06Q 10/10* (2012.01)
*G06F 16/13* (2019.01)
*G06F 16/93* (2019.01)
*G06F 40/205* (2020.01)
*H04L 29/12* (2006.01)

(52) U.S. Cl.
CPC ........ *G06Q 10/107* (2013.01); *H04L 61/1594* (2013.01)

(58) Field of Classification Search
CPC .. G06F 40/205; H04L 61/1594; G06Q 10/105
See application file for complete search history.

(56) References Cited

U.S. PATENT DOCUMENTS

| | | | |
|---|---|---|---|
| 9,467,542 | B1 | 10/2016 | Messenger et al. |
| 2007/0276858 | A1* | 11/2007 | Cushman, II ......... G06F 16/215 |
| 2010/0250308 | A1 | 9/2010 | Mayer et al. |
| 2011/0282890 | A1 | 11/2011 | Griffith |
| 2012/0096389 | A1 | 4/2012 | Flam et al. |
| 2012/0173506 | A1 | 7/2012 | Wilansky et al. |
| 2012/0240038 | A1* | 9/2012 | Curtis .................. G06F 40/174 715/256 |
| 2013/0013768 | A1 | 1/2013 | Andersen et al. |
| 2014/0066044 | A1 | 3/2014 | Ramnani et al. |
| 2015/0347591 | A1* | 12/2015 | Bax .................... G06Q 30/0269 707/749 |
| 2015/0358447 | A1 | 12/2015 | Horling et al. |
| 2017/0024696 | A1 | 1/2017 | Baessler et al. |
| 2017/0024697 | A1 | 1/2017 | Baessler et al. |

OTHER PUBLICATIONS

List of IBM Patents or Patent Applications Treated as Related, signed Apr. 17, 2018, 2 pgs.

* cited by examiner

MAINTAINING A CUSTODIAN DIRECTORY BY ANALYZING DOCUMENTS

BACKGROUND

The present disclosure relates generally to the field of information extraction, and more particularly to generating and maintaining a custodian directory by extracting identity information from documents.

In many circumstances, it is important to be able to retrieve all emails and documents associated with a particular custodian. For example, in a lawsuit involving a corporation, emails and documents written by, or directed to, specific individuals within the corporation are often requested during the discovery phase. Because people often change email addresses over time, or they have multiple email addresses (e.g., a work email address and a personal email address) or user IDs that they use to conduct work, it can be extremely difficult and time consuming to retrieve all of the requested emails and documents associated with the specific individuals. It can also be particularly difficult when the request is for all documents sent to an employee of the company by a specific person who works for a different company.

SUMMARY

Embodiments of the present disclosure include a method, computer program product, and system for generating and maintaining a custodian directory. A computer processor may extract identity information from a document. The identity information may include at least one custodian identity attribute. After extracting the identity information, the computer processor may determine that the identity information is associated with a specific custodian. The computer processor may then search for the custodian identity attribute in a custodian directory to determine whether the custodian directory contains an entry for the custodian. If the custodian is not in the custodian directory, the computer processor may generate a new entry in the custodian directory for the custodian and store the extracted identity information in the new entry.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figures 1A, 1B:
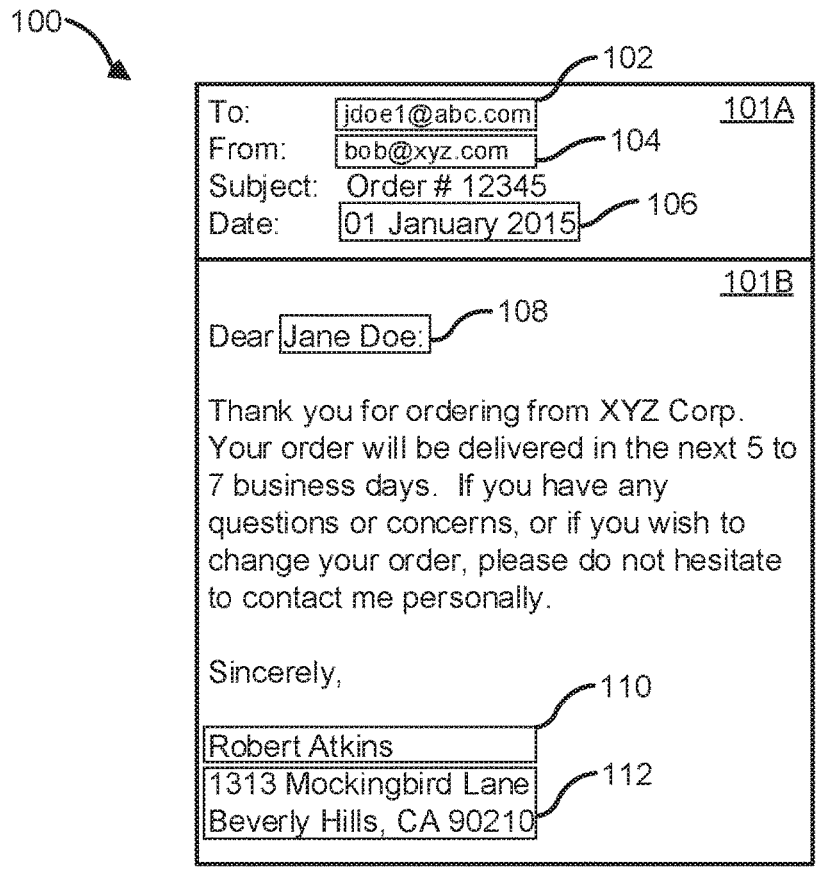
FIG. 1A illustrates an example email from which identity information may be extracted to maintain a custodian directory, in accordance with embodiments of the present disclosure.
FIG. 1B illustrates two entries in a custodian directory that may be generated by extracting identity information from the email of FIG. 1A, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

The present disclosure relates generally to the field of information extraction, and more particularly to generating and maintaining a custodian directory by extracting identity information from documents. While the present disclosure is not necessarily limited to such applications, various aspects of the disclosure may be appreciated through a discussion of various examples using this context.

In many circumstances, it is important to be able to retrieve all emails and documents associated with a particular custodian. For example, in a lawsuit involving a corporation, emails and documents written by, or directed to, specific individuals within the corporation are often requested during the discovery phase. Because people often change email addresses over time, or they have multiple email addresses (e.g., a work email address and a personal email address) or user IDs that they use to conduct work, it can be extremely difficult and time consuming to retrieve all of the requested emails and documents associated with the specific individuals. It can also be particularly difficult when the request is for all documents sent to an employee of the company by a specific person who works for a different company.

In order to make the process of identifying and retrieving documents that relate to an individual custodian less time and resource consuming, a company may wish to automatically generate and maintain a custodian directory. The custodian directory may include historical information regarding custodians with whom the company has associated, such as the custodian's name, email addresses, residential addresses, and phone numbers. The custodian directory may also include, e.g., when the custodian used specific phone numbers, or when the custodian was employed, to help narrow the search parameter that must be used when retrieving documents related to the custodian.

As used herein, a "document" may be a communications document, such as an email, or plain document, such as a word processing document, a spreadsheet, a blog entry, or a wiki document. Other examples of documents include instant messaging communications, documents from collaboration tools, and documents from ticketing systems. A "custodian" may be an individual (e.g., an employee or a customer) or a business entity. "Identity information" (i.e. information pertaining to the identity of the custodians), such as email addresses, names, residential addresses, and phone numbers, may be saved in a "custodian directory," which is a listing of information pertaining to the identities of a plurality of custodians. Each individual piece of identity information regarding a custodian is a "custodian identity attribute." For example, an email address is a custodian identity attribute, as is a residential address and a mobile phone number. Identity information extracted from a document may include one or more custodian identity attributes. The extracted custodian identity attributes may correspond to a single custodian, or they may correspond to multiple custodians. For example, an email may include identity information relating to two custodians: the sender and the recipient.

FIG. 1A illustrates an example email 100 from which identity information may be extracted to maintain a custodian directory, in accordance with embodiments of the present disclosure. A computer system may use an information extraction process to identify and extract identity information in the email 100. Information extraction processes include pattern recognition (or matching), data scraping, and more complex processes such as natural language processing (NLP). The computer system may extract identity information from the email's 100 metadata (such as the "To" and "From" fields), as well as from the email's content, or body.

For example, the computer system may analyze the email 100 and identify six custodian identity attributes 102-112, three in the metadata 101A and three in the content of the email 101B. The first custodian identity attribute 102 is the recipient's email address, and the computer system may extract it from the "To" field in the email's metadata 101A. The second custodian identity attribute 104 is the sender's email address, and the computer system may extract it from the "From" field in the email's metadata 101A. The third custodian identity attribute 106 is the date that the email was sent, and the computer system may extract it from the "Date" field in the email's metadata 101A. While the email 100 is illustrated with one sender and one recipient for illustrative purposes, in some embodiments, the email 100 may contain two or more recipients. The computer system may extract identity information pertaining to the two or more recipients from, e.g., the "cc' and "bcc" fields in addition to the "To" field.

The fourth, fifth, and sixth custodian identity attributes 108-112 may be extracted from the content of the email 101B using a pattern recognition process. The computer system may be configured to search for specific words in specific places in the email 100. For example, the computer system may search for salutation language (such as "Dear") followed by a name near the top of the email 100. As another example, the computer system may search for valediction language (e.g., "Sincerely") followed by a name near the bottom of the email 100. Using pattern recognition, the computer system may identify a fourth custodian identity attribute 108 following the salutation "Dear" in the email's content 101B. The computer system may also identify the fifth and sixth custodian identity attribute 110 and 112 following the valediction "Sincerely" in the email's content 101B. After extracting the identity information from the email 100, the computer system may group the six custodian identity attributes 102-112 according to whether they belong to the same custodian, and associate them with one or more custodians.

FIG. 1B illustrates two entries 120 and 122 in a custodian directory that may be generated by extracting identity information from the email 100 of FIG. 1A, in accordance with embodiments of the present disclosure. The two entries 120 and 122 are visual representations of the custodian identity attributes that were extracted from the email 100 of FIG. 1A, and are shown for illustrative purposes only. A person of ordinary skill will recognize other ways to store the identity information consistent with this disclosure, and the disclosure should not be limited to any specific way of storing and presenting the identity information.

In order to group the six custodian identity attributes 102-112, the computer system may consider their location in the email 100. For example, the fifth and sixth custodian identity attributes 110 and 112 are located following the valediction in the email 100. Based on this, the computer system may recognize that they belong to the sender of the email 100. Likewise, the second custodian identity attribute 104 is an email address that was extracted from the "From" field in the email's metadata 101A, and also corresponds to the sender of the email. The computer system may also determine that the third custodian identity attribute 106 should be associated with the sender because it is the date on which the email was sent. Accordingly, the computer system may recognize that the second 104, third 106, fifth 110, and sixth 112 custodian identity attributes are all associated with a first custodian (the sender), and it may generate a first entry 120 for a custodian directory using the extracted identity information corresponding to the sender.

As another example, the fourth custodian identity attribute 108 is located following the salutation in the email 100. Based on this, the computer system may recognize that the fourth custodian identity attribute belongs to the recipient of the email 100. Likewise, the first custodian identity attribute 102 is an email address that was extracted from the "To" field in the email's metadata 101A, and also corresponds to the recipient of the email. The computer system may also determine that the third custodian identity attribute 106 should be associated with the recipient because it is the date on which the recipient received the email 100. Accordingly, the computer system may recognize that the first 102, third 106, and fourth 108 custodian identity attributes are all associated with a second custodian (the recipient), and it may generate a second entry 122 for a custodian directory using the extracted identity information corresponding to the recipient.

Figure 2:
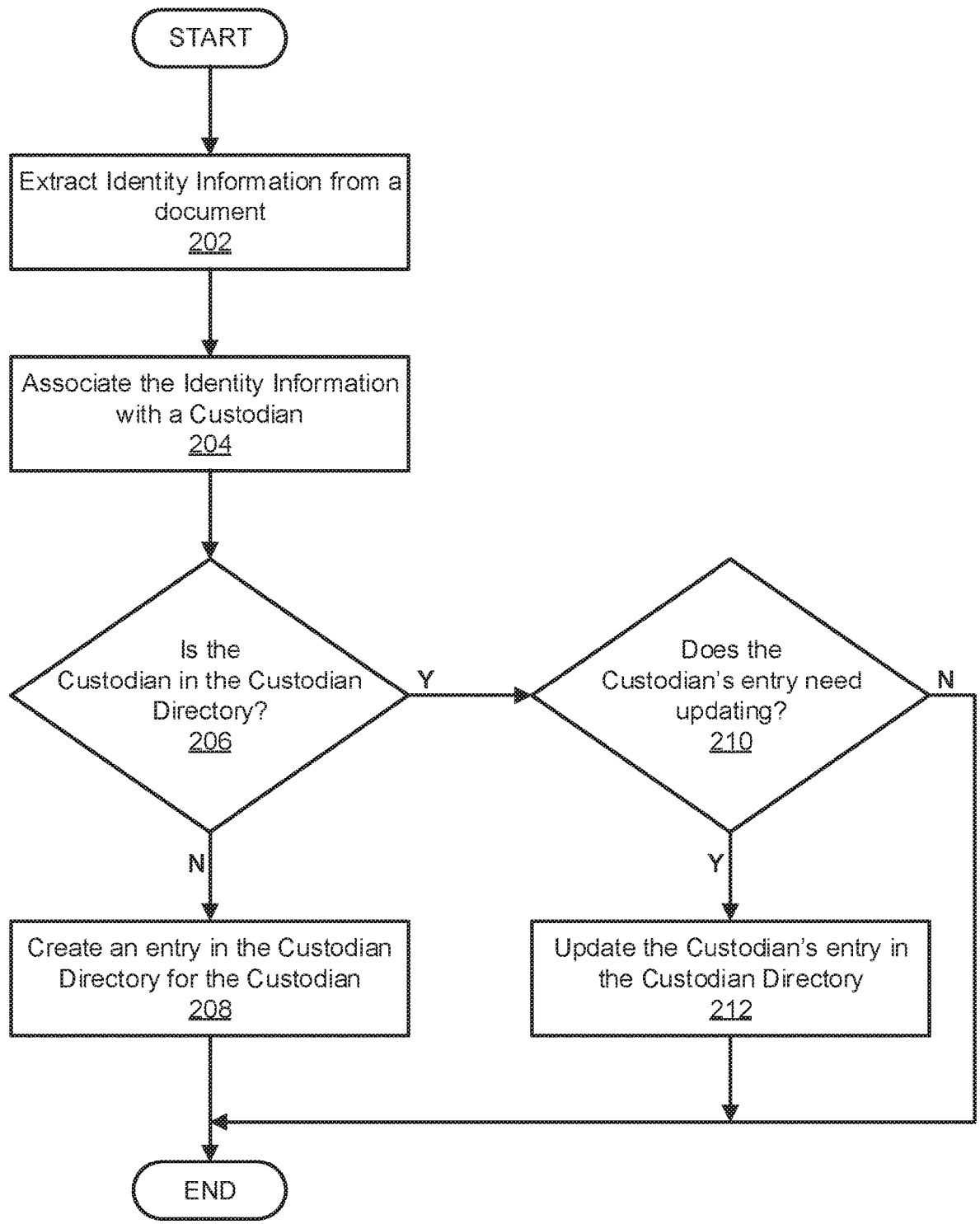
FIG. 2 illustrates a flowchart depicting a method for maintaining a custodian directory by extracting identity information from a document, in accordance with embodiments of the present disclosure.

Referring now to FIG. 2, shown is a flowchart depicting a method 200 for maintaining a custodian directory by extracting identity information from a document, in accordance with embodiments of the present disclosure. The method 200 may be performed by a computer system, such as the computer system described in reference to FIG. 6. In some embodiments, the method 200 may be performed on documents as part of an archiving process. The method 200 may begin at operation 202, where a computer system extracts identity information from a document.

In some embodiments, the document may be a communications document, such as an email. In other embodiments, the document may be a plain document, such as a word processing document or spreadsheet. The computer system may extract identity information from the document's metadata. For example, if the document is an email, the computer system may extract the identity information from the metadata fields such as the "To" field and the "From field. If the document is a word processing document, the document's metadata fields may include an author field and an access control list.

Metadata relating to a workstation's network address (such as a static IP address or a MAC address) may also be used to identify a custodian. For example, a custodian may send emails from two or more email addresses using the same computer system. The custodian may be the only person with access to the computer system. The computer system may be identified by a MAC address or by a static IP address. Because the computer may be only accessible by a single user, all email addresses used to send emails with the MAC address or static IP address belonging to the computer system may be identified as belonging to the same custodian.

In some embodiments, the computer system may extract identity information from the content of the document. The computer system may utilize an information extraction process, such as pattern recognition, data scraping, or natural language processing, to extract identity information from the document. When using a pattern recognition process, the computer system may scan the document for key words that identify where identity information may be present. For example, if the document is an email, the computing system may identify salutations (e.g., "Dear") and valedictions (e.g., "Sincerely") to identify where identity information is located. As another example, the computer system may recognize that a plain document often contains a signature block at the end that contains various custodian identity attributes, such as a name, title, customer ID, and email address. The computer system may look for the signature block by identifying a valediction, and recognizing that a block of single spaced text following the valediction may be include identity information. The computer system may then analyze the blocks of text to extract identity information from them.

Various information extraction methods that may be used to extract identity information from a document are known to a person of ordinary skill. The use of any information extraction method that is otherwise consistent with this disclosure is contemplated.

After the computer system extracts identity information from the document per operation 202, the computer system may associate the identity information with a custodian at operation 204. The computer system may group the identity information together based on, e.g., its location within the document or the purpose of its metadata field. For example, as discussed more thoroughly in reference to FIGS. 1A and 1B, the name following a salutation and the email address in the "To" field generally refer to a first custodian (the recipient), while the identity information following the valediction and the email address in the "From" field generally refer to a second custodian (the sender). As another example, the computer system might recognize a signature block containing a name, title, company, address, and phone number as following a valediction. Because the custodian identity attributes are all found together in the same signature block, the computer system may determine that they all belong to the same custodian.

In some embodiments, a document may contain identity information related to a single custodian. For example, an internal opinion letter outlining a change in the law and an analysis of how it affects a company may not be directed towards any individuals. In these cases, only information relating to the author of the opinion letter may be determined through an analysis of the document. In other embodiments, a document may contain identity information related to multiple custodians. A common example of this is an email, which has a recipient and a sender/author, and was discussed herein in reference to FIGS. 1A and 1B.

After associating the identity information with a custodian per operation 204, the computer system may determine whether the custodian is in a custodian directory at decision block 206.

In some embodiments, the identity information may include a custodian ID. The custodian ID may depend on how the custodian directory is set up. For example, in some embodiments the custodian ID may be the email address used by the custodian. In embodiments where the identity information includes a custodian ID, the computer system may search for the custodian ID in the custodian directory at operation 206.

In some embodiments, such as where the custodian directory does not use a custodian ID or the identity information does not include a custodian ID, other custodian identity attributes that were extracted at operation 202 may be used to determine whether the custodian is in the custodian directory. The computer system may search for each of the extracted custodian identity attributes, sequentially or simultaneously. If there is a potential match, the computer system may compare the extracted identity information to the entry in the custodian directory to determine whether they both relate to the same custodian.

After identifying a potential match in the custodian directory, a computer system may generate a comparison score based on the relationship between the two entries by comparing each of the custodian identity attributes. In some embodiments, each field may be weighted according to the likelihood that it is unique to a particular custodian. For example, the first and last name fields may not count very much towards the comparison score because many people within a company may share the same name. On the other hand, the email address may weigh heavily in the comparison score because they are often unique and belong only to a single custodian.

In some embodiments, the computer system may use a "fuzzy logic" matching system when comparing the custodian identity attributes to determine whether the custodian is in the custodian directory. For example, if an address is listed as "1313 Mockingbird Lane" in the custodian directory, and "1313 Mockingbird Ln" in the document, the computer system might recognize that the addresses are the same. As another example, alternative names, such as nicknames, may be considered to be the same as it's associated given name. The computer system might recognize "William" and "Bill," or "Robert" and "Bob," as being the same name. Likewise, the computer system might recognize a name with an accent (or other diacritic, such as an umlaut) over a letter as being a match with the same name without the accent (e.g., Gomez and Gomez are a match).

In some embodiments, the computer may only give partial credit for fuzzy matches. For example, if a matched first name is worth 1 point towards the comparison score, a fuzzy match may only be worth 0.5 points. As another example, in some embodiments, a full match may be worth 1 point, a mismatch worth −1 points, and a fuzzy match worth 0 points. Many other variations for scoring the similarity between two entries will be recognized by one of ordinary skill. All such variations are contemplated by this disclosure.

In some embodiments, a mismatch in a specific field may indicate that the custodian is not in the custodian directory, regardless of the closeness between the other fields. For example, a custodian may have a hire date of 2015 listed in the custodian directory, and the document analyzed at operation 202 may have been created in 2007. Accordingly, the computer system may determine that the custodian in the custodian directory is not the same as the custodian in the document, even if all other fields match, because a custodian hired in 2015 is not likely to have created the document in 2007.

After generating the comparison score, the computer system may compare the comparison score to a threshold to determine whether the custodian is in the custodian directory. The threshold may be the minimum score that a potential match has to obtain for the computer system to determine that the custodian is in the custodian directory. In some embodiments, the threshold may be set by a user or administrator. In other embodiments, the threshold may be determined by the computer system based on, e.g., historical data relating to custodian directory matches. For example, if the computer system determines that 99% of matches are approved (or not reverted) when the comparison score is above a certain number, the computer system may set the threshold to that number.

If the custodian is not in the custodian directory, the computer system may create an entry in the custodian directory for the custodian at operation 208. The entry may include some or all of the identity information extracted from the document. After the computer system creates a new entry for the custodian at operation 208, the method 200 may end.

If the custodian is found in the custodian directory at decision block 206, the computer system may determine whether the custodian's entry in the custodian directory needs to be updated at decision block 210. The computer system may compare the custodian identity attributes extracted from the document to the custodian directory. If there is no difference between any of the extracted custodian identity attributes and the custodian directory, the computer system may determine that no update is needed. If, however, an extracted custodian identity attribute is different than its corresponding field in the custodian directory, the custodian directory may need to be updated.

In some embodiments, the computer system may determine that the custodian directory does not need to be updated if the extracted identity information is equivalent to, though not an exact match with, the custodian directory. For example, the extracted identity information may list a custodian's address as "1313 Mockingbird Ln." The corresponding entry in the custodian directory may have the address as "1313 Mockingbird Lane." Even though the addresses do not exactly match, the computer system may recognize that "Ln" and "Lane" are equivalents, and that the custodian directory does not need updating. In some embodiments, the computer system may also recognize nicknames as being the same (e.g., William and Bill), and it may recognize names without accents as being the same as names with accents (e.g., Gomez and Gómez).

In some embodiments, changes to a custodian identity attribute saved in the directory may replace the old custodian identity attribute. For example, if a custodian's mobile phone number has changed, the new mobile phone number may replace the old mobile phone number in the custodian directory. In some embodiments, the custodian directory may maintain historical information related to the custodian. In these embodiments, an updated custodian identity attribute related to a custodian will be saved in addition to the older information. For example, if a custodian moves and has a new residential address, the new address may be saved in addition to the older address. Information pertaining to the move, such as the date that the custodian last used his old address and the date that he first used his new address, may also be saved in the custodian directory.

If the computer system determines that the custodian's entry in the custodian directory does not need to be updated at decision block 210, the method 200 may end. If, however, the computer system determines that the custodian's entry does need to be updated, the computer system may update the entry at operation 212. After the computer system updates the custodian directory at operation 212, the method 200 may end.

In some embodiments, first and last seen information for the custodian may be kept in the custodian directory. The first and last seen information may apply to the custodian, or to individual custodian identity attributes. Whenever a document is analyzed that references a specific custodian identity attribute, the last seen record for that custodian identity attribute may be updated. For example, a custodian may have an entry in the custodian directory that includes a custodian identity attribute for each of his email address, phone number, and residential address. If the computer system extracts identity information from a document, and the identity information includes the custodian's email address, the last seen field for the email address in the custodian directory may be updated with the date that the document was created.

Figure 3:
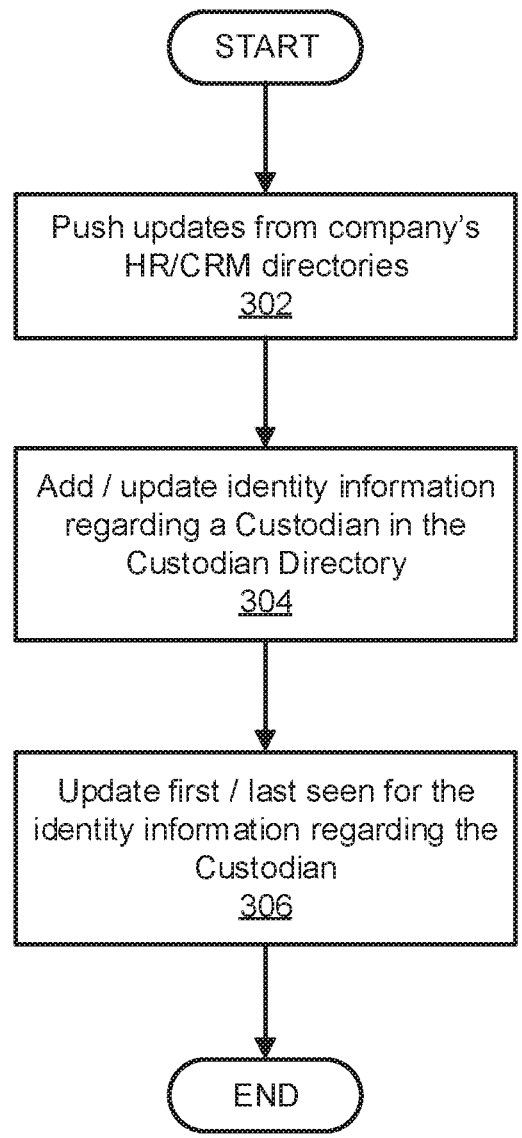
FIG. 3 illustrates a flowchart depicting a method for maintaining a custodian directory using a human resources (HR) or customer relationship management (CRM) directory, in accordance with embodiments of the present disclosure.

FIG. 3 illustrates a flowchart depicting a method 300 for maintaining a custodian directory using a human resources (HR) or customer relationship management (CRM) directory, in accordance with embodiments of the present disclosure. The method 300 may be performed by a computer system. The method 300 may being at operation 302, where a computer system pushes updates from a company's human resources (HR) and customer relationship management (CRM) directories to the custodian directory.

In some embodiments, updates to a company's HR and CRM directories are automatically pushed to the custodian directory whenever the updates are saved to the HR and CRM directories. In other embodiments, updates to a company's HR and CRM directories may be pushed to the custodian directory periodically. For example, the changes to the HR and CRM directories may be pushed to the custodian directory on the first of every month. After updates from the HR and CRM directories are pushed at operation 302, the computer system may add or update identity information regarding one or more custodians in the custodian directory at operation 304.

In some embodiments, the computer system may create a new entry in the custodian directory for a custodian at operation 304. For example, if a company hires a new employee, the employee may be added to the HR directory. When updates are pushed from the HR directory at operation 302, the computer system may determine that a corresponding entry does not exist in the custodian directory because the custodian (new employee) was recently hired. If the computer system does not find the custodian in the custodian directory, it may create a new entry for the employee and populate the fields of the new entry with identity information received from the HR directory.

In some embodiments, the computer system may find the custodian in the custodian directory and may update the custodian's entry to include new or changed information (e.g., updates to a custodian identity attribute) received from the HR or CRM directories. For example, if an employee changes his residential address, the HR directory might be updated. When the HR directory's updates are pushed to the custodian directory, the computer system may modify the custodian's residential address in the custodian directory.

In some embodiments, the custodian directory may keep historical information regarding the custodians. In these embodiments, instead of modifying fields in the custodian directory with new or updated information, additional fields may be generated in the custodian directory to store the new information. For example, if a custodian moves, he will have a new residential address. When the new residential address is pushed from the HR directory to the custodian directory, a new field may be created for the new residential address, and the field may be populated using the information from the HR directory. A date field may also be generated to identify when the custodian first used the new residential address. The old residential address may continue to be stored in the custodian directory. After updating the identity information for the custodian at operation 304, the computer system may update first seen and last seen information for the custodian.

In some embodiments, the first and last seen information may be kept for the custodian as an entity. For example, any time a document referencing the custodian is archived, or a custodian identity attribute is updated in the custodian directory, the last seen record may be updated for the custodian. In other embodiments, first and last seen dates may be tracked for individual custodian identity attributes. In addition to, or instead of, a last seen field for the custodian, one or more custodian identity attributes may have a corresponding last seen field. Whenever an update is pushed from the HR or CRM directories that changes, or confirms, a custodian identity attribute, the last seen date for the custodian identity attribute may be updated.

For example, a custodian may have an entry in the custodian directory that includes a custodian identity attribute for each of his email address, phone number, and residential address. An update to the HR directory may be pushed to the custodian directory, and the update may include a change to the custodian's email address, and a confirmation that the phone number and residential address are unchanged. Based on this update, the computer system may update the custodian's email address in the custodian directory. The computer system may also update the last seen date for the phone number and residential address to the date that the HR directory was pushed to the custodian directory.

After the last seen and first seen dates in the custodian directory are updated for the custodian at operation 306, the method 300 may end.

Figure 4A:
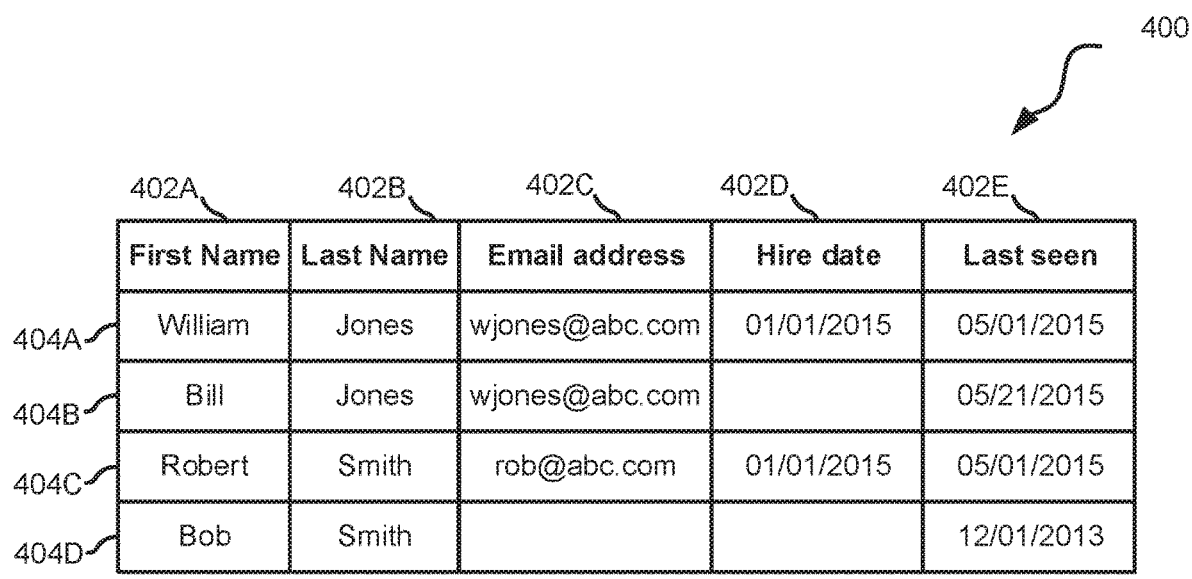
FIG. 4A illustrates an example custodian directory in which illustrative embodiments of the present disclosure may be implemented.

FIG. 4A illustrates an example custodian directory 400 in which illustrative embodiments of the present disclosure may be implemented. The custodian directory 400 may have five fields 402A-402E. Each field may correspond to a different custodian identity attribute. For example, the first field 402A may correspond to the first name of the custodian. The custodian directory 400 also has four entries 404A-404D. Each entry corresponds to a custodian.

Periodically, the custodian directory 400 may undergo a merge process. The merge process is discussed in reference to FIG. 5. During the merge process, entries in the custodian directory 400 will be analyzed to determine if two or more entries correspond to the same custodian. If the entries are determined to correspond to the same custodian, they may be merged into a single entry.

Using the example shown in FIG. 4A, a computer system might identify the first entry 404A as being a potential match with the second entry 404B, indicating that the two entries may belong to the same custodian. The entries might be identified as being potential matches because they share a same (or a similar) custodian identity attribute. For example, the first entry 404A and the second entry 404B both have "Jones" as the last name in the second field 402B, and both entries also have "wjones@abc.com" listed as the email address in the third field 402C. Likewise, the third entry 404C and the fourth entry 404D may be flagged as a potential match because their second fields match (i.e., both entries have a last name of "Smith").

After identifying potential matches in the custodian directory, a computer system may generate a relationship score based on the relationship between the two entries by comparing each of the custodian identity attributes in the two entries. In some embodiments, each field may be weighted according to the likelihood that it is unique to a custodian. For example, the first and last name fields may not count very much towards the relationship score because many people within a company may share the same name. On the other hand, the email address may weigh heavily in the relationship score because email addresses are often unique and are not shared by more than one custodian. In some embodiments, the computer system may use a "fuzzy logic" matching system when comparing the custodian identity attributes. Different methods for weighting the custodian identity attributes are discussed more thoroughly in reference to FIG. 2.

Figure 4B:
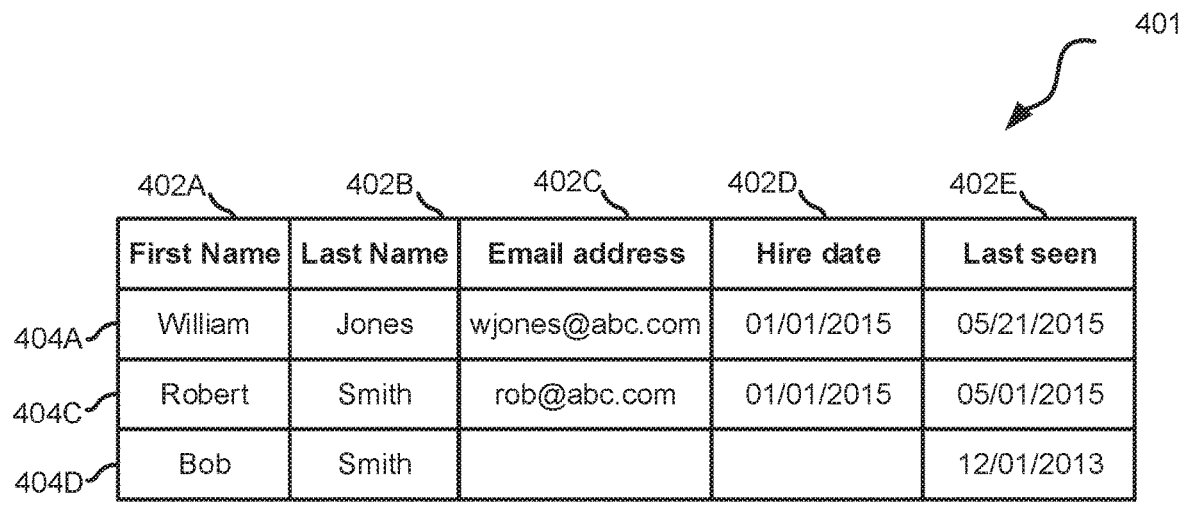
FIG. 4B illustrates the example custodian directory of FIG. 4A after entries belonging to the same custodian have been merged, in accordance with embodiments of the present disclosure.

FIG. 4B illustrates the example custodian directory of FIG. 4A after entries belonging to the same custodian have been merged, in accordance with embodiments of the present disclosure. The updated custodian directory 401 includes the same five fields 402A-402E, and has three custodian entries 404A, 404C, and 404D. The first entry 404A has been updated to include information from the second entry 404B, which has been deleted after the information was merged. Because the second entry 404B had a more recent "last seen" date in the fifth field 402E, the last seen field for the first entry 404A in the updated custodian directory 401 has been changed. Meanwhile, because the computer system determined that the third and fourth entries 404C and 404D do not belong to the same custodian, the third and fourth entries remain unchanged.

Figure 5:
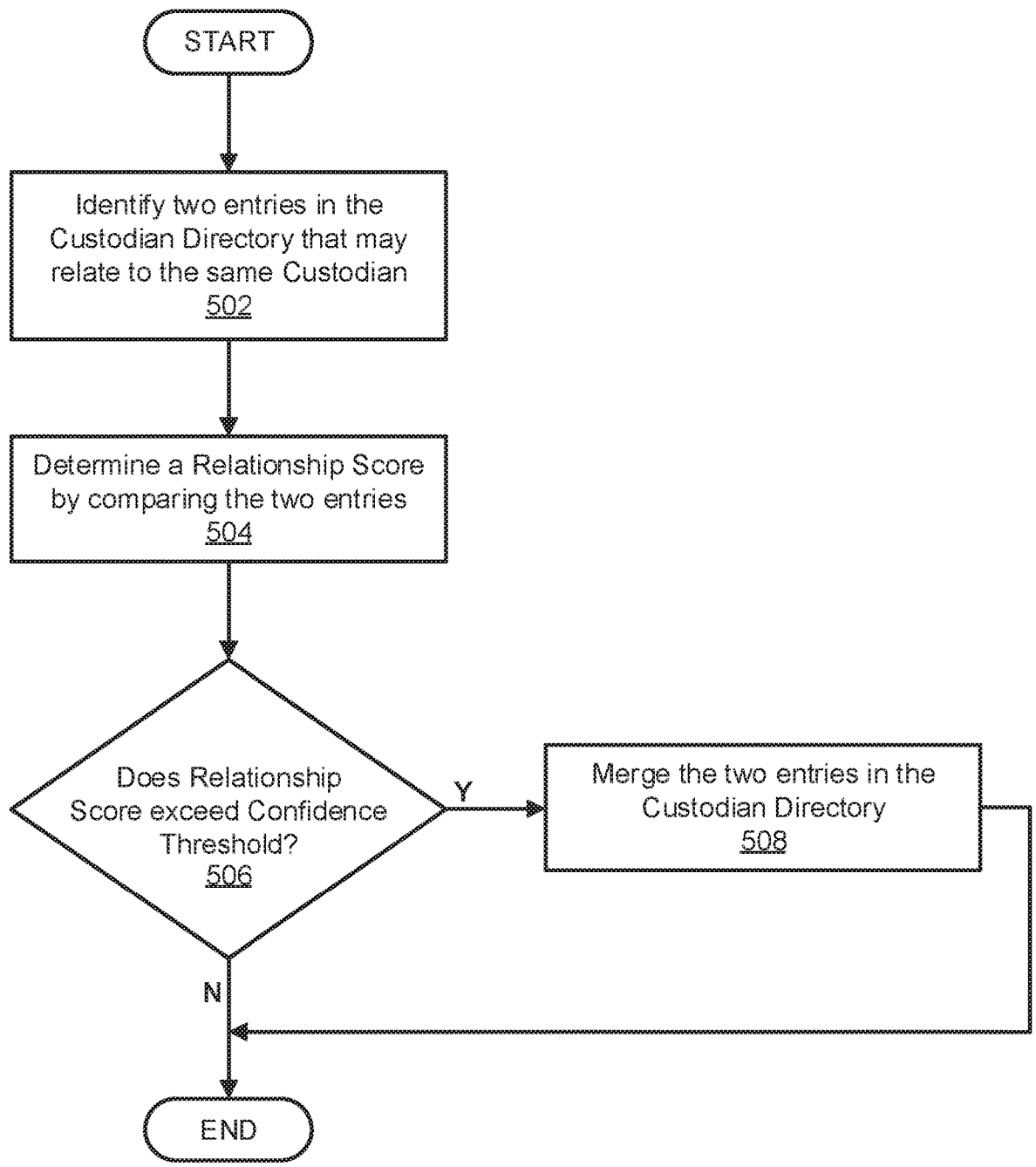
FIG. 5 illustrates a flowchart depicting a method for merging multiple entries belonging to the same custodian into a single entry in a custodian directory, in accordance with embodiments of the present disclosure.

FIG. 5 illustrates a flowchart depicting a method 500 for merging multiple entries belonging to the same custodian into a single entry in a custodian directory, in accordance with embodiments of the present disclosure. The method 500 may be performed by a computer system as part of, e.g., a directory cleanup process. The method 500 may begin at operation 502, where a computer system may identify two entries in a custodian directory that may relate to the same custodian.

In order to identify two entries in a custodian directory that may relate to the same custodian, the computer system may identify entries that have a common custodian identity attribute. For example, two entries that both have the same email address might be flagged for further review. In some embodiments, only custodian identity attributes that are likely to be unique to a specific custodian may be used to identify two potential matches. For example, custodian identity attributes relating to residential addresses, email addresses, and mobile phone numbers may be used to identify potential matches, whereas information that is unlikely to belong to a single custodian (such as work addresses) may be ignored.

After identifying two entries that may relate to the same custodian at operation 502, the computer system may determine a relationship score for the two entries at operation 504 by comparing the identity information for the two entries. In some embodiments, each field may be weighted according to the likelihood that it is unique to a particular custodian. For example, the first and last name fields may not count very much towards the relationship score because many people within a company may share the same name. On the other hand, the email address may weigh heavily in the relationship score because email addresses are often unique and belong only to a single custodian (e.g., employees generally have their own email address and do not share it with other employees).

In some embodiments, the computer system may use a "fuzzy logic" matching system when comparing the custodian identity attributes for the two entries. For example, if an address is listed as 1313 Mockingbird Lane in one entry, and 1313 Mockingbird Ln in another entry, the computer system might recognize that the addresses are the same. As another example, common nicknames may be considered to be the same as its associated given name. The computer system might recognize "William" and "Bill," or "Robert" and "Bob," as being the same name. Likewise, the computer system might recognize a name with an accent over a letter as being a match with the same name without the accent (e.g., Gomez and Gomez are a match).

In some embodiments, the computer may only give partial credit for fuzzy matches. For example, if a matched first name is worth 1 point towards the relationship score, a fuzzy match may only be worth 0.5 points. As another example, in some embodiments, a full match may be worth 1 point, a mismatch worth −1 points, and a fuzzy match worth 0 points. Many other variations for scoring the similarity between two entries will be recognized by one of ordinary skill. All such variations are contemplated by this disclosure.

In some embodiments, a mismatch in a specific field may indicate that the two entries do not belong to the same custodian, regardless of the closeness between the other fields. For example, if a custodian in a first entry was last seen in 2002, and a custodian with a second entry has a hire date of 2006, the computer system may determine that the two entries should not be merged, even if all other fields match. After generating the relationship score per operation 504, the computer system may compare the relationship score to a threshold value to determine whether to merge the entries at decision block 406.

The confidence threshold may be the minimum score that a match has to obtain for the entries to be merged. In some embodiments, the confidence threshold may be set by a user or administrator. In other embodiments, the confidence threshold may be determined by the computer system based on historical data relating to custodian directory merges. For example, if the computer system determines that 99% of merges are approved (or not reverted) when the relationship score is above a certain number, the computer system may set the confidence threshold to that number.

If the relationship score does not exceed the confidence threshold at decision block 506, the method 500 may end. If, however, the relationship score does exceed the confidence threshold, the entries may be merged in the custodian directory at operation 508. Some custodian identity attributes in the two entries may differ, and the computer system may determine, during the merge process, which entry's custodian identity attribute to keep. For example, two entries that are to be merged may share everything except the mobile phone number. In some embodiments, the computer system may decide to keep the most recently seen mobile phone number. In some embodiments, the computer system may generate a new field in the custodian directory for a second mobile phone number and may keep both in the custodian directory. The computer system may also generate a new field for the date when the new mobile phone number was first used and populate the field with the date that the new phone number was first seen. After the entries are merged at operation 508, the method 500 may end.

Figure 6:
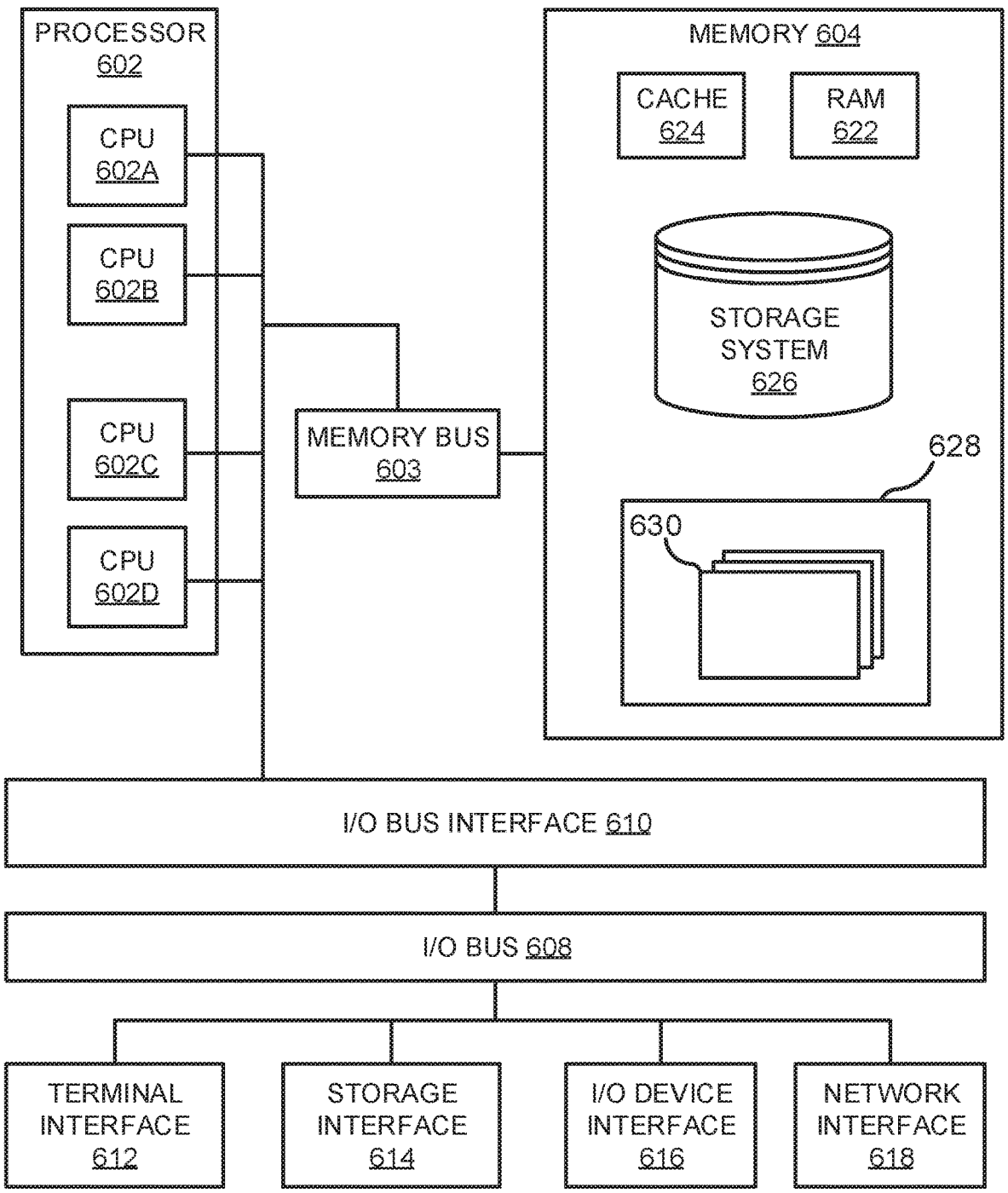
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 630 generally perform the functions or methodologies of various embodiments.

For example, in an embodiment of the present disclosure, the program modules 630 may include an information extraction module, a directory maintenance module, and a directory merge module. The information extraction module may include computer instructions to analyze a document (such as a word processing document or an email), to extract identity information (e.g., a custodian ID or email address)

from the document, to group the identity information such that each group corresponds to a different custodian, and to associate each group of identity information with a custodian.

The directory maintenance module may include computer instructions to search a custodian directory for the custodians identified by the identity extraction module and, in response to not finding the custodian in the custodian directory, create a new entry in the custodian directory for the custodian. If the custodian is found in the custodian directory, the directory maintenance module may further include computer instructions to determine whether the custodian's entry needs to be updated, and to update, if necessary, the custodian's entry. In some embodiments, the directory maintenance module may further include computer instructions to receive updates from a company's HR and CRM directories and to update the custodian directory accordingly.

The directory merge module may include computer instructions to identify two entries in a custodian directory that may correspond to the same custodian. The directory merge module may further include computer instructions to score the relationship between the two entries, compare the score to a threshold, and, in response to the score exceeding the threshold, merge the two entries in the custodian directory.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system for maintaining a custodian directory, the system comprising:
   a memory;
   a processor communicatively coupled to the memory, wherein the processor is configured to perform a method comprising:
   identifying two or more entries in a custodian directory that have at least one matching custodian identity attribute;
   generating a relationship score for two or more entries, the relationship score being a score that indicates a level of similarity between the two or more entries;
   determining, based on the relationship score satisfying a confidence threshold, that the two or more entries in the custodian directory relate to a same custodian, wherein the confidence threshold is a minimum score that the two or more entries have to obtain for the two or more entries to be merged; and merging, in response to determining that all of the two or more entries relate to the same custodian, the two or more entries in the custodian directory.

2. The system of claim 1, wherein generating the relationship score includes determining a weighting factor for each field in the custodian directory.

3. The system of claim 2, wherein generating the relationship score further includes:
identifying a first plurality of custodian identity attributes for a first entry in the custodian directory;
identifying a second plurality of custodian identity attributes for a second entry in the custodian directory;
comparing each custodian identity attribute in the first plurality of custodian identity attributes to a corresponding custodian identity attribute in the second plurality of custodian identity attributes to generate a score for each custodian identity attribute;
weighting each score using the weighting factors; and
generating the relationship score for the two or more entries using the weighted scores.

4. The system of claim 2, wherein the weighting factor for each respective field is based on a likelihood that the custodian identity attribute for the respective field is unique to a single custodian.

5. The system of claim 1, wherein generating the relationship score comprises:
identifying a first plurality of custodian identity attributes for a first entry in the custodian directory;
identifying a second plurality of custodian identity attributes for a second entry in the custodian directory; and
comparing each custodian identity attribute in the first plurality of custodian identity attributes to a corresponding custodian identity attribute in the second plurality of custodian identity attributes.

6. The system of claim 4, wherein the custodian identity attributes are compared using fuzzy logic matching.

7. The system of claim 1, wherein the custodian identity attribute is a name, and wherein identifying two or more entries in a custodian directory that have at least one matching custodian identity attribute comprises:
identifying a first name in a first entry in the custodian directory;
identifying a second name in a second entry in the custodian directory;
determining that the first name is an alternative name for the second name.

8. The system of claim 1, wherein identifying two or more entries in a custodian directory that have at least one matching custodian identity attribute comprises:
identifying a first set of fields in the custodian directory, the first set of fields including fields with information that is unique to individual custodians;
identifying a second set of fields in the custodian directory, the second set of fields including fields with information that is not unique to individual custodians; and
comparing custodian identity attributes in the first set of fields for a first entry to corresponding custodian identity attributes for a second entry.

9. The system of claim 8, wherein the first set of fields includes one or more selected from a group consisting of residential addresses, email addresses, and mobile phone numbers.

10. The system of claim 8, wherein the second set of fields includes work addresses.

11. The system of claim 1, wherein generating a relationship score for the two or more entries includes:
identifying a critical field;
determining that the custodian identity attributes associated with the critical field for the two or more entries do not match; and
assigning a relationship score that does not satisfy the confidence threshold in response to determining that the custodian identities attributes associated with the critical field for the two or more entries do not match.

12. The system of claim 1, wherein the confidence threshold is based on historical data relating to custodian directory merges.

13. The system of claim 1, wherein merging the two or more entries in the custodian directory comprises:
determining that a first custodian identity attribute in a first merged entry does not match a second custodian identity attribute for a second merged entry, the first and second custodian identity attributes corresponding to the same field in the custodian directory;
determining to keep the first custodian identity attribute; and
storing the first custodian identity attribute in a merged entry.

14. The system of claim 13, wherein determining to keep the first custodian identity attribute includes determining that the first custodian identity attribute was added to the custodian directory more recently than the second custodian identity attribute.

15. The system of claim 13, wherein merging the two or more entries in the custodian directory further comprises:
deleting the second custodian identity attribute.

16. The system of claim 13, wherein merging the two or more entries in the custodian directory further comprises:
determining to keep the second custodian identity attribute;
generating a new field in the custodian directory; and
storing the second custodian identity attribute for the second merged entry in the new field in the custodian directory.

17. A system for maintaining a custodian directory, the system comprising:
a memory;
a processor communicatively coupled to the memory, wherein the processor is configured to perform a method comprising:
identifying two or more entries in a custodian directory that have at least one matching custodian identity attribute;
generating a relationship score for two or more entries, the relationship score being a score that indicates a level of similarity between the two or more entries;
determining, based on the relationship score satisfying a confidence threshold, that the two or more entries in the custodian directory relate to a same custodian; and
merging, in response to determining that all of the two or more entries relate to the same custodian, the two or more entries in the custodian directory, wherein merging the two or more entries in the custodian directory comprises:
determining that a first custodian identity attribute in a first merged entry does not match a second custodian identity attribute for a second merged entry, the first and second custodian identity attributes corresponding to the same field in the custodian directory;

determining to keep the first custodian identity attribute; and storing the first custodian identity attribute in a merged entry.

18. The system of claim 17, wherein determining to keep the first custodian identity attribute includes determining that the first custodian identity attribute was added to the custodian directory more recently than the second custodian identity attribute.

19. The system of claim 17, wherein merging the two or more entries in the custodian directory further comprises:

deleting the second custodian identity attribute.

20. A system for maintaining a custodian directory, the system comprising:

a memory;

a processor communicatively coupled to the memory, wherein the processor is configured to perform a method comprising:

identifying two or more entries in a custodian directory that have at least one matching custodian identity attribute;

generating a relationship score for two or more entries, the relationship score being a score that indicates a level of similarity between the two or more entries, wherein generating the relationship score includes:

determining a weighting factor for each field in the custodian directory;

identifying a first plurality of custodian identity attributes for a first entry in the custodian directory;

identifying a second plurality of custodian identity attributes for a second entry in the custodian directory;

comparing each custodian identity attribute in the first plurality of custodian identity attributes to a corresponding custodian identity attribute in the second plurality of custodian identity attributes to generate a score for each custodian identity attribute;

weighting each score using the weighting factors; and generating the relationship score for the two or more entries using the weighted scores;

determining, based on the relationship score satisfying a confidence threshold, that the two or more entries in the custodian directory relate to a same custodian; and merging, in response to determining that all of the two or more entries relate to the same custodian, the two or more entries in the custodian directory.

* * * * *